United States Patent [19]

Newson et al.

[11] 4,109,416
[45] Aug. 29, 1878

[54] VEHICLE DOOR ARRANGEMENTS

[75] Inventors: John Chase Newson; Geoffrey Robinson Tregoning; James Baden Digby, all of London, England

[73] Assignee: Westinghouse Brake & Signal Co. Ltd., London, England

[21] Appl. No.: 745,864

[22] Filed: Nov. 29, 1976

Related U.S. Application Data

[63] Continuation of Ser. No. 553,005, Feb. 25, 1975, abandoned.

[30] Foreign Application Priority Data

Sep. 27, 1974 [GB] United Kingdom ............... 41994/74
Dec. 12, 1974 [GB] United Kingdom ............... 53843/74
Mar. 21, 1974 [GB] United Kingdom ............... 12758/74

[51] Int. Cl.$^2$ ................................................ E06B 7/28
[52] U.S. Cl. ..................................................... 49/316
[58] Field of Search ................................... 49/316, 497

[56] References Cited

U.S. PATENT DOCUMENTS 3,086,261  4/1963  Lapof ...................................... 49/316
3,359,687  12/1967  Wallace ................................... 49/477

Primary Examiner—Kenneth Downey
Attorney, Agent, or Firm—Larson, Taylor and Hinds

[57] ABSTRACT

A vehicle door arrangement in which a lower edge part of the door is retractable upwards into the main part of the door prior to opening. This ensures that when the vehicle is standing alongside a platform, there is no risk of the bottom of the door fouling the platform. The arrangement is particularly suitable for slide and plug doors which move outwards and then alongside the vehicle when opening. Even if the bottom of the door is normally above the platform, the invention provides an essential safety feature to cope with situations where the vehicle is abnormally depressed, e.g. by excessive loading or suspension failure. Moreover, the invention enables the height of the interior floor of vehicle to be optimised with respect to platform level so as to enhance passenger safety and convenience, whereas with prior art rigid one-piece doors, clearance requirements dictated non-optimum floor heights.

3 Claims, 16 Drawing Figures

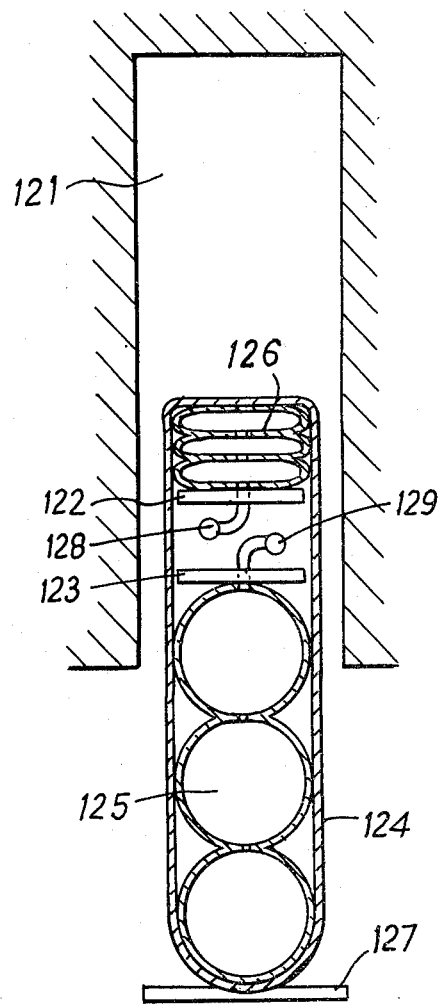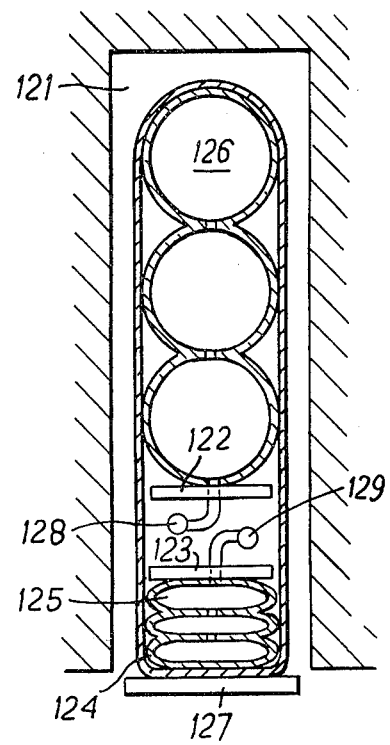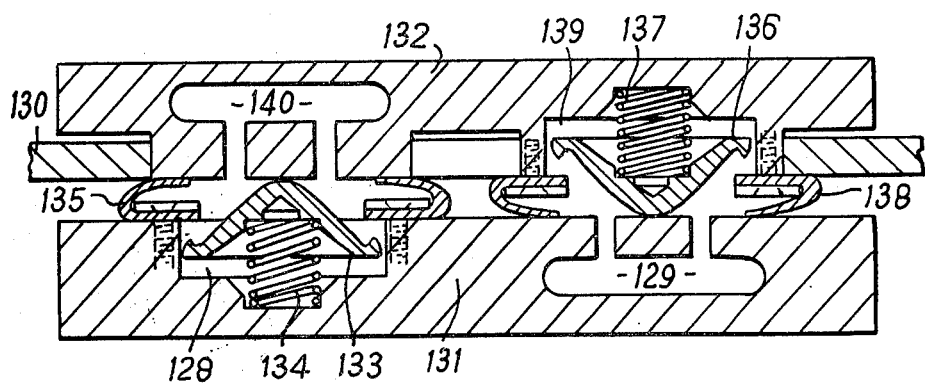

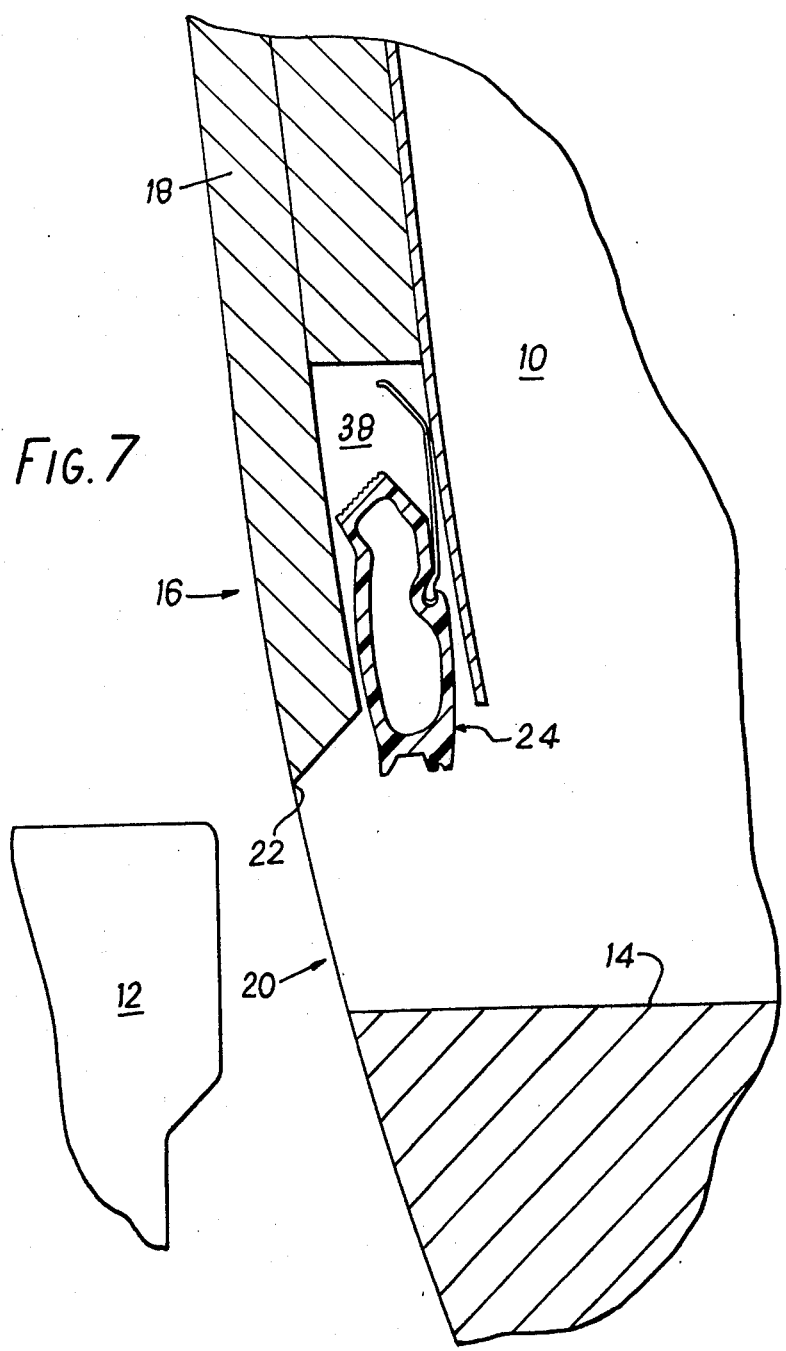

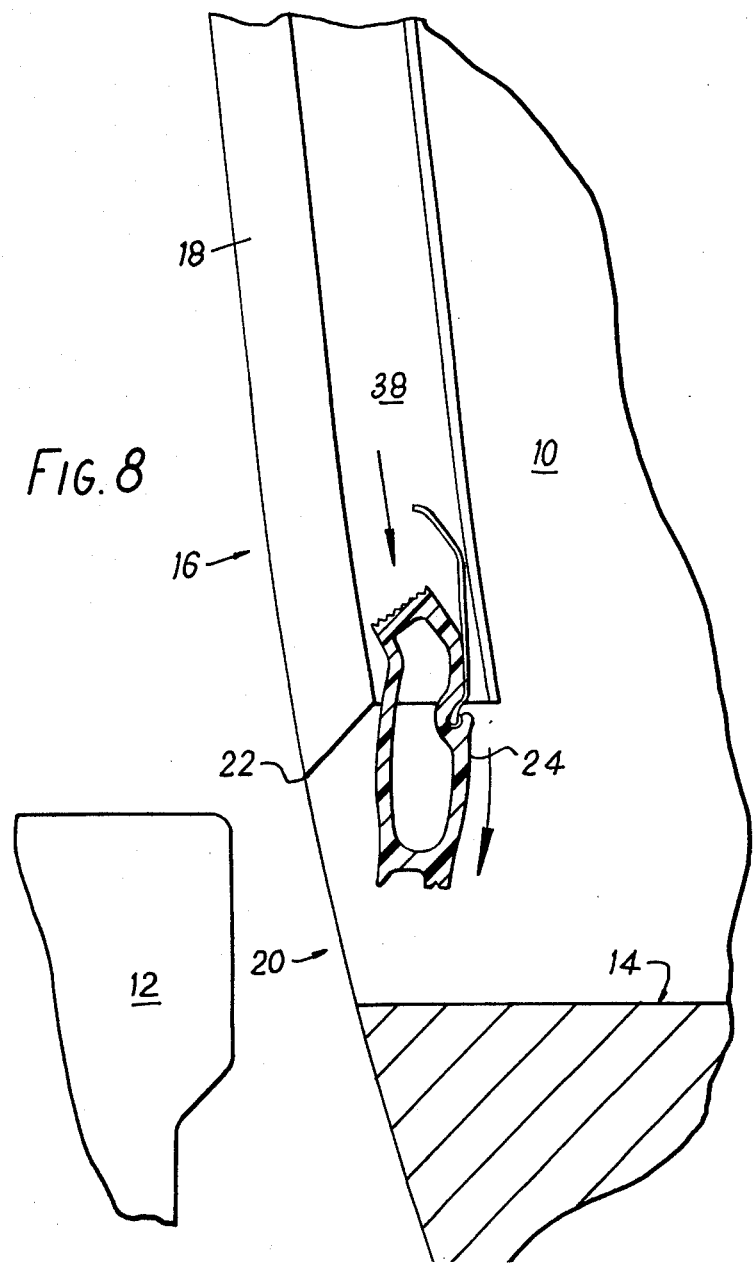

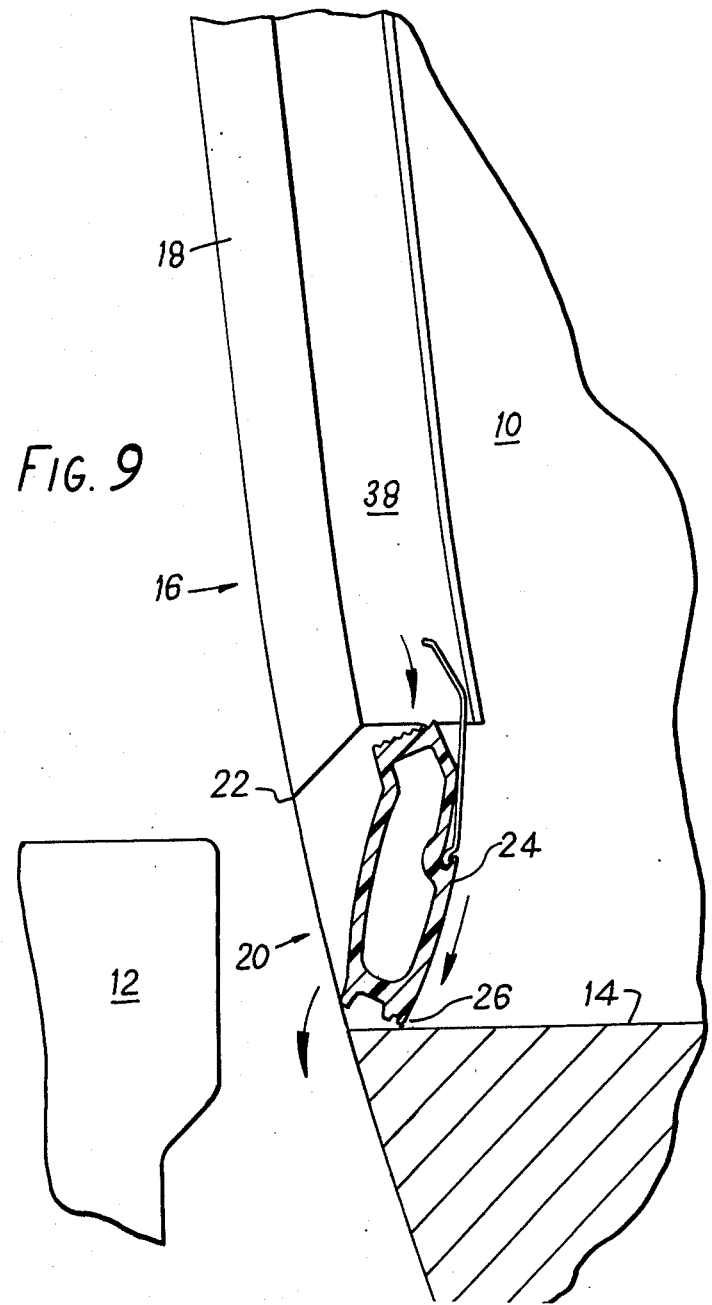

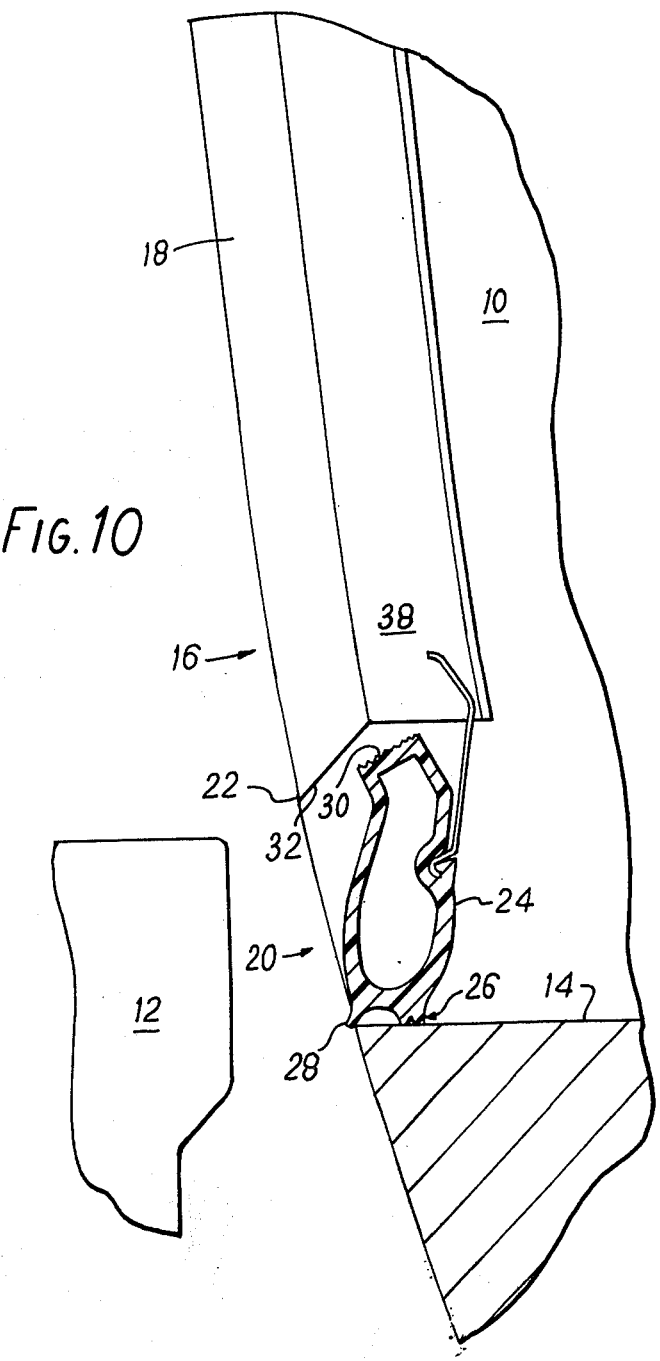

VEHICLE DOOR ARRANGEMENTS

This is a continuation of application Ser. No. 553,005, filed Feb. 25, 1975 and now abandoned.

This invention relates to vehicle door arrangements.

With certain forms of passenger carrying vehicles, particularly railway vehicles, it is preferred to employ what are known as "slide and plug" doors, that is to say, doors which, when closed, are flush with the vehicle's exterior (which is usually at least partly streamlined), and are opened by limited outward movement of the door as a whole followed by sideways movement. When it is required that "slide and plug" doors be opened while a vehicle is adjacent a platform which is higher than the lowermost part of the door, there is a risk of the door fouling the platform, and if adequate lateral clearance is left between the vehicle and the platform there is the converse risk (or increased risk) of passengers falling between the vehicle and platform.

Furthermore, even where the platform edge is normally lower than the lowermost part of a closed door, it is still necessary or at least highly desirable to allow for the event of the bottom edge of the door becoming lower than the platform. Such an event might be caused by excessive loading of the vehicle and/or by failure of the vehicle's suspension (for example, there might be excessive leakage from an air-spring leading to collapse of the air-suspension member).

One possible solution to the above problem would be to raise the threshold of the door by a sufficient extent to cater for all eventualities, but this would involve an unacceptably high step down from the train to the platform.

It is therefore an object of the invention to provide an improved vehicle door arrangement which obviates or mitigates the above problems.

According to the invention there is provided a vehicle door arrangement comprising an upper main part and a lower edge part for closing a gap between the upper main part of the door and a doorway occupied by the door when in a closed position, and moving means operable to retract said lower edge part upwardly into the door prior to opening of the door from the closed position thereof and for extending the lower edge part downwardly to close the gap upon reaching said closed position, the lower edge part being hollow and deformable, and the moving means comprising pneumatic means for inflating and deflating at least selected parts of the lower edge part or seal. Inflatable and deflatable parts of the lower edge part are formed of inflatable and deflatable bladders enclosed within an outer enclosure of the lower edge part, and the lower edge part is mounted by attachment to the ends of a rigid partition dividing the bladders, the ends being made accessible at ends of the outer enclosure.

Preferably the inflatable and deflatable parts of the lower edge part or seal are formed of inflatable and deflatable bladders enclosed within an outer enclosure of the lower edge part or seal and the lower edge part or seal can be mounted by attachment to the ends of a rigid partition dividing the bladders, the ends being made accessible at ends of the outer enclosure.

The lower edge part or seal is preferably divided into two parts or regions respectively formed by one or more of said bladders, the parts or regions being disposed on either side of said partition. Each part or region may be provided with an inlet/outlet valve member cooperating in the closed position of the door with a like valve member fixed on the doorway, a respective valve in each valve member being held open when the door is closed and biased shut when the door is open, and operable to pass air to and from the parts or regions when open and to block leakage of air when shut.

In order that the invention may be more clearly understood and readily put into effect, first, second and third embodiments of door arrangements will now be described by way of example only (it being noted that the second embodiment is exemplary of the instant invention, and the first and third embodiments are not claimed herein), with reference to the accompanying drawings wherein:

FIGS. 4 and 5 are vertical cross-sections of the second embodiment;

FIG. 6 is an enlarged section of part of the second embodiment;

FIGS. 7-11 show a vertical cross-section of part of the third embodiment in various positions;

Figure 1:
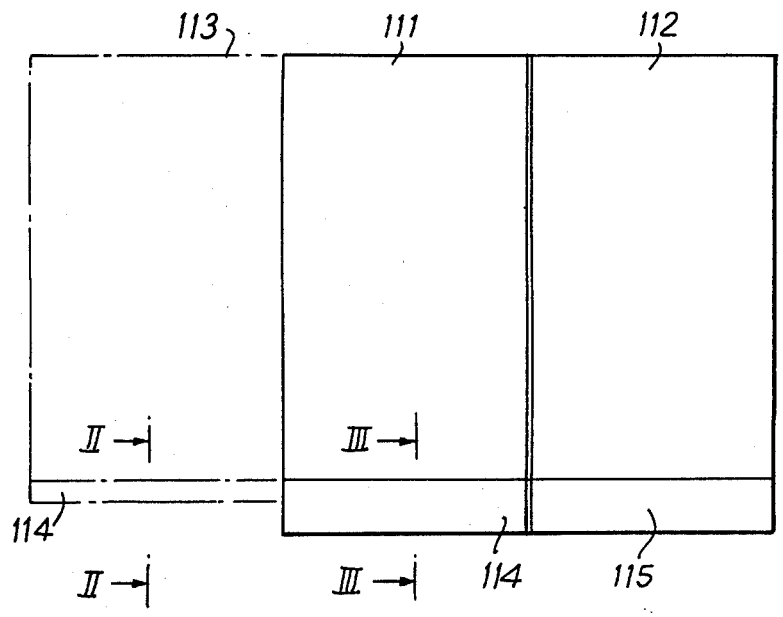
FIG. 1 is a diagrammatic elevation of the first embodiment.

Referring first to FIG. 1, the doors denoted by references 111 and 112 are sliding plug doors and are shown in the closed position across an aperture of a doorway. The position of the door 111 when open is denoted by the dotted outline 113 and it will be seen that the door 111 has a lower edge portion reference 114 which is shown retracted at 114 in the open position of the door. The door 112 has a similar retractable lower edge portion 115.

Figure 2:
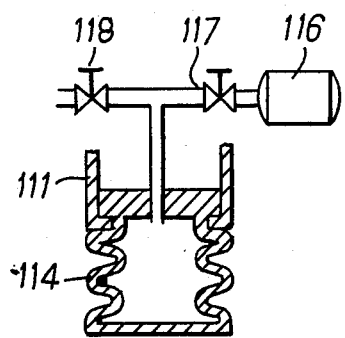
FIGS. 2 and 3 are cross-sections respectively taken on the lines II—II and III—III in FIG. 1.
Figure 3:
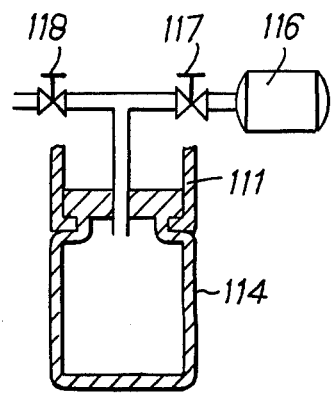

The lower edge portions 114 and 115 may comprise firm portions which by suitable retracting mechanisms are arranged to respective recesses in the lower edges of the doors 111 and 112 respectively. Alternatively and preferably, the lower edge portions 114 and 115 are formed of inflatable flexible members which in the relaxed condition are as shown in FIG. 2, representing the open door position. The seal moving means may be arranged to inject air under pressure into the inflatable member when the doors attain their closed positions. In this manner, the inflatable lower edge portion is thrust by the air pressure downwards against the threshold of the doorway as shown in FIG. 3, to effect a complete closure, whilst in the open position the lower edge of the door is sufficiently retracted to clear a station platform adjacent to which a rail vehicle including the doors comes to rest albeit that there is less than a door thickness between the vehicle and the station platform and the lower edge of the door in the closed position may come to rest at a level which is lower than the level of the platform.

The inflatable lower edge portion may be provided with an inlet valve which in the closed position of the door comes into sealing engagement with a port via which air pressure is transmissable to the inflatable member in the closed position. Each inflatable lower edge portion may also be provided with exhaust valve means which has a small mechanical actuator which is actuated to close the exhaust valve in a position of abutment with a fixture in the door frame which is conveniently placed having regard to the operating mechanism. As soon therefore as a door begins to leave the closed position, the small actuator enables the air pressure within the inflatable lower edge portion of the door to be vented to atmosphere and the lower edge portion reverts from an inflated state such as shown in FIG. 3 to its naturally retracted state such as shown in FIG. 2.

By way of example, air for inflation may be supplied by a high-pressure air reservoir 116 and be controlled by a suitable valve 117, while deflation (exhaustion to atmosphere) is controlled by a further suitable valve 118. This means for supplying and controlling air is shown only schematically since it may take any suitable form. For example, flexible pipes between the door and the doorframe may be employed to carry the air, or an arrangement such as will subsequently be described with reference to FIG. 6 could alternatively be used. The valves 117 and 118 are preferably automatically actuated by movement of the door 111.

In the second embodiment as shown in FIGS. 4 and 5, a rail vehicle door is only shown to the extent of a recess denoted by reference 121 which is provided in the lower edge of the door. The recess is intended to extend substantially the full width of the door and means is provided within the recess for fixing at the ends thereof a partition formed of two spaced horizontal members 122 and 123 disposed one above the other. It is to be understood therefore that the horizontal members 122 and 123 remain in the fixed position within the door recess regardless of the operation of the seal and the space between the members 122 and 123 provides for access for connection of inlet and exhaust ports to the inflatable regions of the seal. The seal consists of an outer sleeve 124 of flexible but substantially non-extendable material within which there are provided two inflatable regions 125 and 126 disposed on either side of the partition formed of members 122 and 123 around which the sleeve 124 extends. In the downwardly extended position of the seal, the lower inflatable region 125 is inflated and the upper inflatable region 126 is exhausted as shown in FIG. 4 and a firm rubber flexible foot 127 carried at the lower edge of the seal is clearly seen extending beneath the lower edge of the door.

For practical reasons in the interests of obtaining within a given thickness of seal, a desired magnitude of extendability, the regions 125 and 126 are each formed of a plurality, in the present instance three, inflatable enclosures which in the exhausted condition deflate into a comparatively compact stack as shown in the case of the upper inflatable region in FIG. 4, or the lower inflatable region in FIG. 5. One manner in which the ends of these enclosures can be sealed to enable substantially a flat stack to be produced in the uninflated condition, is to close the ends of the inflatable enclosures by flat flexible thin diaphragms which are biassed to collapse inwardly when exhausted so that chafing of the ends will thus be minimal. By increasing the number of interconnected inflatable enclosures which are employed for the inflatable region, the magnitude of the opening which a seal constructed in accordance with the invention can be adapted to close can readily be increased and the converse is also true.

Where the invention is applied to a sliding plug door in a rail vehicle, ports 128 and 129 can be located as foreshadowed above in the space between the horizontal members 122 and 123 and these ports 128 and 129 can be adapted to engage corresponding fixed ports in the top edge 130 of the doorway as shown to a much enlarged scale in the horizontal cross-section of FIG. 6. The ports 128 and 129 link with a valve member 131 which mates with an identical valve member 132 when the door is in the closed position. The valve member 131 contains a first poppet valve 133 biassed by a spring 134 in a direction which tends to engage with the underside of an annular rubber gasket 135, but is displaced to an air-passing position as shown by engagement with the valve member 132 when the door is closed. The second poppet valve 136 is identical to the first poppet valve except for being mounted in the stationary valve member 132 which is fixed to the doorway frame edge 130. The second poppet valve 136 includes a biassing spring 137 and an annular gasket 138, as in the first poppet valve 133. The gaskets 135 and 138 each form an air-tight pressure resisting seal between the first and second valve members 131 and 132 when the door is closed.

When the door is fully closed with the seal extended as in FIG. 4 and it is desired to open the door, the seal is first retracted by exhausting the region 125 to atmosphere via the port 129, through the air-tight seal formed by the gasket 138, the second poppet valve 136 and a fixed passage 139 leading to atmosphere, while simultaneously applying air pressure through a fixed passage 140 past the air-tight seal formed by the gasket 135, the first poppet valve 133, and the port 128 to fill the region 126 with high pressure air. The seal will then be retracted as shown in FIG. 5 and the door can open. As soon as the door starts to open, the valve members 131 and 132 will cease to be proximate, so allowing the valves 133 and 136 to seal against the respective gaskets 135 and 138 under the influence of the respective biassing springs 134 and 137. The poppet valve 133 retains air pressure within the port 128 and the seal region 126 even though the valve members 131 and 132 have parted, while the air pressure via the passage 139 used to inflate the seal region 126 is prevented from being lost to atmosphere by reason of the closure of the valve 136.

The reverse procedure occurs when the door is closed and it is desired to move the seal from the FIG. 5 position to the FIG. 4 position, this time high pressure air being supplied via the passage 139, the valve 136, and the port 129 to the region 125 while the region 126 is exhausted via the port 128, the valve 133 and the passage 140 to atmosphere. The necessary high pressure air conveniently comes from the supply for the vehicle's air brakes.

Referring now to FIG. 7, there is shown a part cross-section in a vertical plane, of a vehicle 10 standing adjacent a platform 12. The internal floor level of the vehicle 10 is indicated at 14, and it will be noted that this is below the top of the platform 12. The illustrated cross-section of the vehicle 10 includes a doorway opening 16, the majority of which opening is occupied by a sealing structure in the form of a "slide and plug" door 18 known per se. In the closed position as shown in FIG. 7, there is a gap 20 between the bottom edge 22 of the door 18 and the floor 14, the gap 20 being a consequence of the bottom edge 22 being high enough adequately to clear the top of the platform 12 when the door 18 is opened (by movement which is firstly to the left and then vertically out of the plane of FIG. 7). Obviously it is desirable to seal the gap 20 in a draft and rain-proof manner. To this end there is provided an elongated hollow resilient seal 24 extending the full width of the door 18. The seal 24 is shown positioned to be fully retracted within the door 18 in FIG. 7, while FIGS. 8-11 show the seal 24 in successive positions during its re-positioning to a position in which the gap 20 is sealed. A coupling mechanism by which the seal 24 is coupled to the door 18 and moved to requisite positions is omitted from FIGS. 7-10 for the sake of clarity.

Let it now be assumed that the door 18 has been moved from a position along the outside of the vehicle 10 in which it does not overlap the doorway 16, through an intermediate position in which the door 18 is aligned with the doorway 16, to a further position in which the door 18 is moved bodily inwards to enter and close-off the majority of the doorway 16, such that there remains only the sealing of the gap 20 to complete the sealing of the doorway 16. Such a position is illustrated in FIG. 7.

FIG. 8 illustrates the next position in the sequence, in which the seal 24 is moved mainly in a downward direction, with some clockwise movement (as viewed in the Figures).

FIG. 9 follows on from FIG. 8, and shows a heel 26 as being the first part of the seal 24 to contact the floor 14. At this stage of the repositioning of the seal 24, downward movement of the seal 24 practically ceases. Subsequent movement of the seal 24 substantially is anti-clockwise pivoting movement about the line where the heel 26 is in contact with the floor 14.

FIG. 10 shows a continuation of the anticlockwise pivoting of the seal 24 which commenced in the FIG. 9 intermediate position. In the FIG. 10 intermediate position a significant force develops between the heel 26 and the floor 14, to commence pressure-tight sealing of the gap 20, and at the same time a toe 28 on the seal 24 commences wiping contact with the outer edge of the floor 14, this outer edge being the bottom outer edge of the doorway 16.

Figure 11:
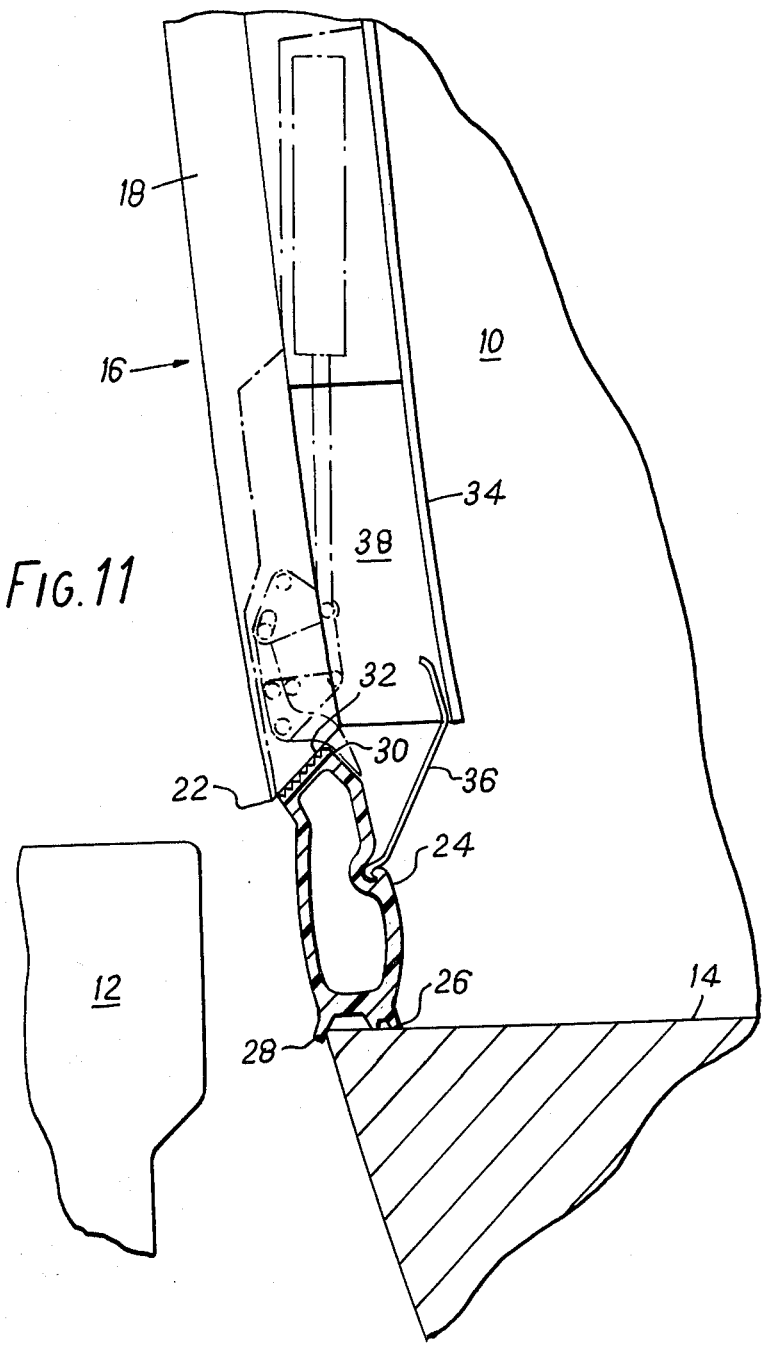

FIG. 11 illustrates the terminal position of the seal 24, in which it tightly seals the gap 20 by reason of the heel 26 and toe 28 being firmly pressed against the floor simultaneously with the pressing of a ribbed top surface 30 of the seal 24 against a bottom face of 32 of the door 18. In this position, the toe 28 and the edge 22 form preferential points for the detachment of water drops from the exterior surface of the arrangement, thereby to obviate frost bonding of the seal 24 to the door 18 or to the doorway 16. The space left between the inboard face of the seal 24 and the inner skin 34 of the door 18 is filled by a plurality of relatively narrow width flaps 36 pivotally mounted on the inboard surface of the seal 24 to be transported thereby, and resiliently biassed clockwise (as viewed in FIGS. 7-11) to tend to bear against the skin 34. Unlike the seal 24, the flaps 36 are discontinuous along the width of the door 18 since they are relatively rigid but require to accommodate substantial deformation of the seal 24 should an object, such as a passenger's foot, be trapped between the floor 14 and the seal 24 during the latter's descent.

The seal 24 is accommodated, when in its retracted position, in a hollow space 38 bounded by the outer section of the door 18 and the inner skin 34. The hollow space 38, which extends the full width of the door 18, is suitably enlarged at either end to accommodate the coupling mechanisms which were omitted from FIGS. 7-11 and which will now be illustrated in and described with reference to FIGS. 12 and 13.

Figure 12:
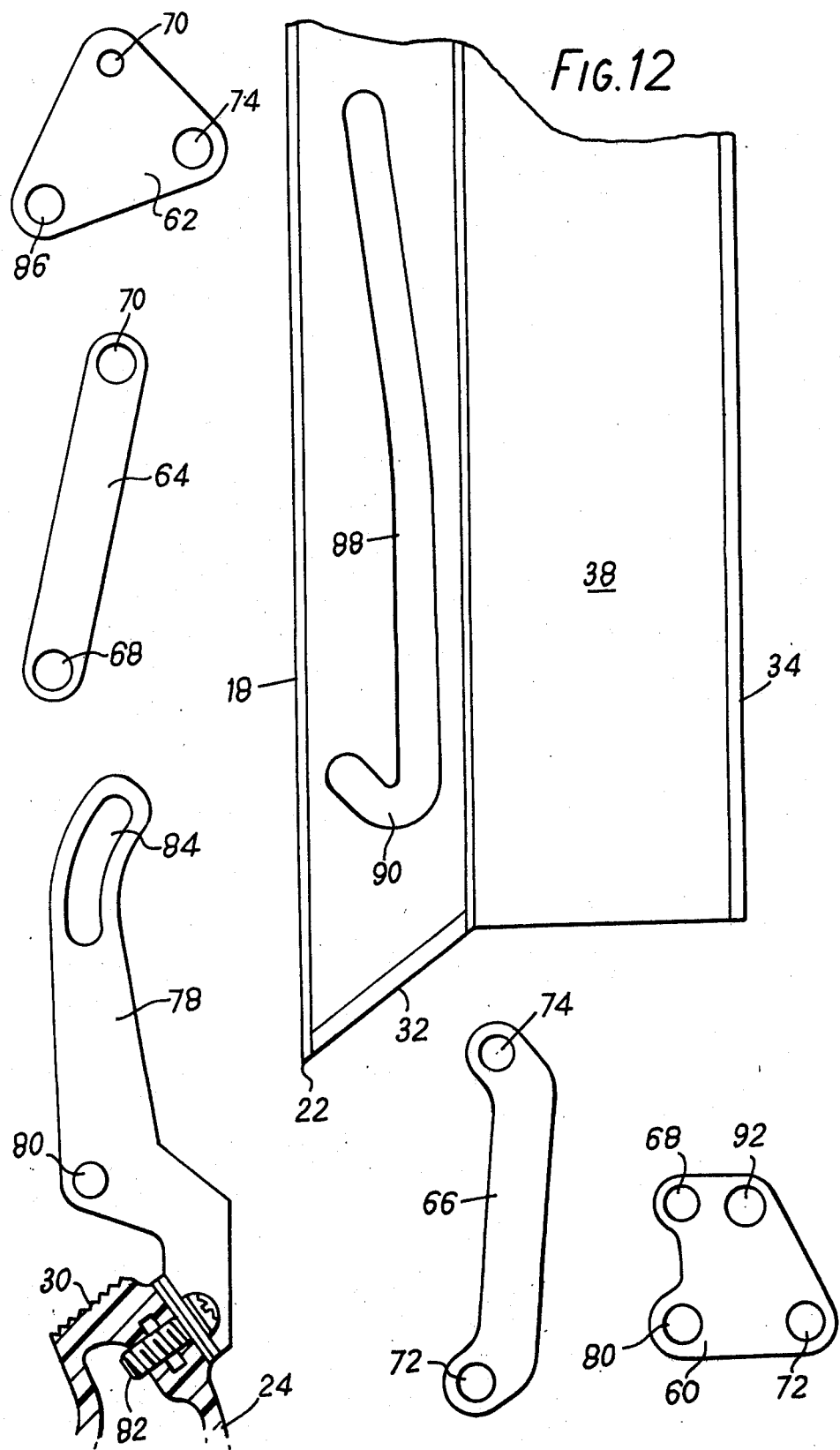
FIGS. 12 and 13 show the coupling mechanism of the third embodiment (which was omitted from FIGS. 7-11 for clarity) to an enlarged scale.
Figure 13:
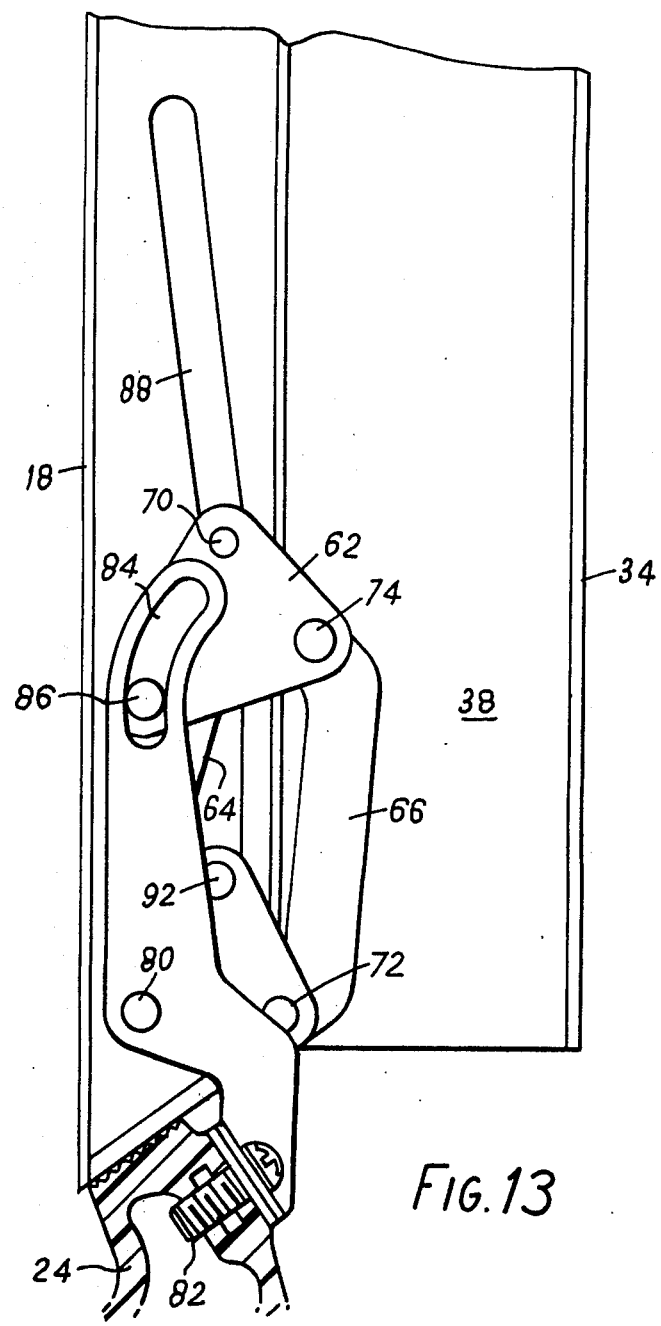

FIG. 12 is an exploded view of the mechanism showing its components separately, while FIG. 13 is a view of the mechanism assembled in operative form with overlapped parts being invisible.

The mechanism comprises a first plate 60 and a second plate 62 which are pivotally coupled in the manner of a four-bar chain by a first link 64 and a second link 66. The mutual pivot points and fulcra of the plates 60 and 62, and the links 64 and 66, are denoted 68, 70, 72 and 74 on each component, the appearance of the same reference at points on two different components in FIG. 12 signifying that these points are coincident in the assembly, as may be seen from FIG. 13. A bellcrank 78 is pivoted at the point 80 upon the first plate 60 and carries the seal 24 which is secured thereto by any suitable means such as a screw 82. A slot 84 at the ends of the arm of the bellcrank 78 not supporting the seal 24 cooperates with a pin 86 on the second plate 62 such that angular movement of the bellcrank 78, and hence of the seal 24, about the pivot 80 is dictated by the position of the pin 86 relative to the pivot 80. The door 18 has built thereinto an extended slot 88 of which a major portion is substantially straight and substantially vertical, and the lower end portion 90 is in the form of a sharp curve of approximately 120° angular extent. The point 68 on the first plate 60, together with a further point 92, are constrained to follow the path defined by the slot 88 by means of rollers (not shown) whose axes are coincident with the points 68 and 92 and which run within the slot 88. The mechanism is actuated to position the seal 24 as described with reference to FIGS. 7-11 by means of thrust applied in a generally vertical direction between a fixed point on the door and a suitable point on the mechanism such as the pivot 72. The fixed point at which the thrust motor (not shown) is anchored is conveniently a suitable distance vertically above the mechanism. The thrust motor may be a pneumatically or hydraulically actuated piston and cylinder, or a linear electric motor, and is preferably located entirely within the door 18. If desired, a suitably coupled rotary motor may alternatively be employed in place of the thrust motor. Alternative linkages may be employed in place of the illustrated mechanism. For practical reasons, it is preferred to duplicate the mechanism, one being disposed at each side of the door, so that the seal 24 is supported at two spaced-apart points.

Figure 14:
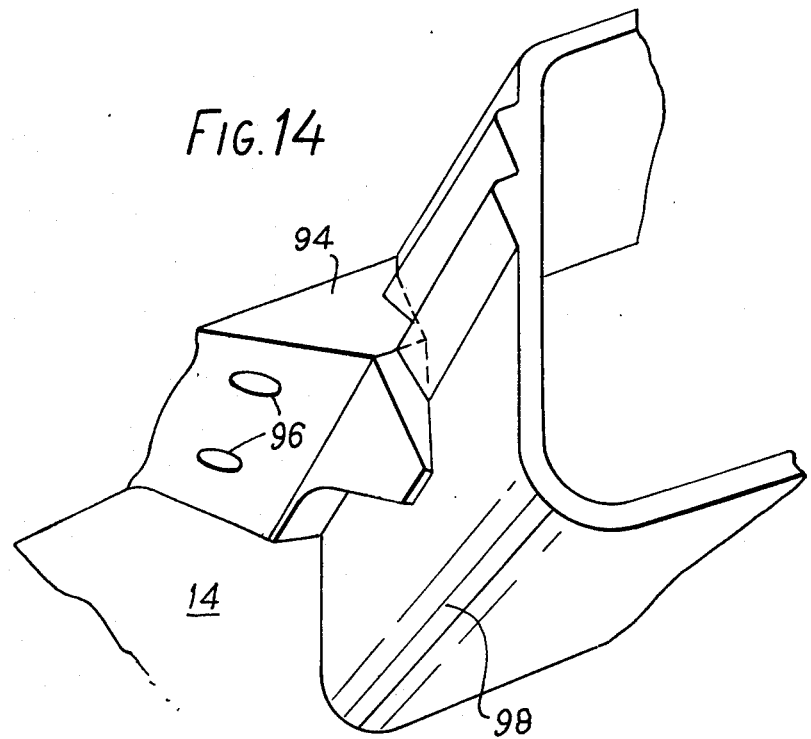
FIGS. 14, 15 and 16 illustrate sundry details of the third embodiment.
Figure 15:
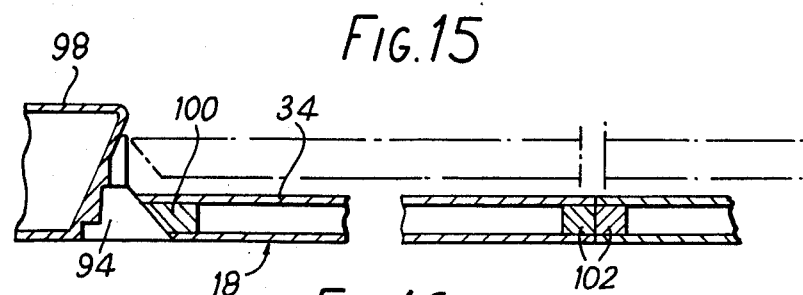
Figure 16:
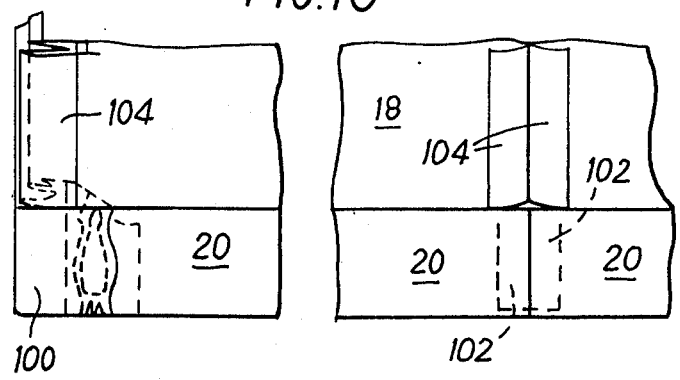

Considering now the application of the invention to twin half-doors of a vehicle such as the oppositely retracting half-doors of an underground train (e.g. as in London Transport and the Paris Metro) there exists the problem of providing sealing between the vertical edges of the door and the doorway, and between the meeting vertical edges of the half-doors, particularly at the bottoms of the doors where the above described seal arrangement is employed. Assuming the seal 20 to be made in the form of a flexible extruded rubber section, cut lengths appropriate to the widths of particular doors would have their ends blanked-off with shaped resilient rubber plugs (not shown in FIGS. 7-13) so as to present smooth end faces. When the adjacent half-doors are closed and the bottom seals are being extended or retracted, the respective mechanism may not work in precise synchronism and therefore in order to avoid jamming or scuffing between seal ends it is important that a small end clearance be provided throughout at least a substantial proportion of the seal movement. If effectively weather-proof sealing is to be provided in the final doors-closed position of the seals, the clearance should be eliminated in this position. Moreover the corners between the floor 14 and the vertical sides of the doorway 16 must also be effectively sealed. FIG. 14 shows a fixed corner seal 94 for the above purpose, viewed from above and slightly to one side from a point within the doorway 16. The corner seal 94 is preferably manufactured from the same rubber material as the seal 20, so as to present a similar external appearance. The seal 94 is fastened by two screws 96 to the (horizontally sectioned) door post 98 forming the edge of the doorway 16, and is angled towards the centre of the door opening 16 from the outside inwardly of the opening so as to wedge against the door (not shown in FIG. 14) when it "plugs" the doorway. FIG. 15 shows a vertical part-view from above of the seals 20 of two half-doors sectioned horizontally near the foot thereof, and illustrates a corner section 100 shaped to match the corner seal 94. The corner sections are mounted on the outer ends of the seals 20 as shown in FIG. 10 which is a horizontal part-view from outside, of the two half-doors. The meeting ends of the seals 20 are provided with plain-faced butt seals 102. When unplugging the seals 20 in the two half-doors, they are moved apart sideways by means not shown, to the chain-dot positions shown in FIG. 15, prior to movement in the reverse sequence to that shown in FIGS. 7–11. The vertical edges of the half-doors are provided with suitable flexible seals 104, which may be arcuate and/or ribbed in cross-section.

The vehicle 10 has not been detailed since the invention may be applied to any suitable land, sea, or air vehicle. A particular application (by way of example only) is a passenger-carrying rapid-transit railway vehicles.

Whilst the invention has been particularly described with reference to sliding plug-doors, the invention is applicable to other forms of door where substantial clearances are required to be provided between the lower edge of the door and a part of a vehicle or station platform close to which the door comes to rest when in other than the closed position.

The invention can also be applied to sealing of doors and doorways and equivalent openings in things other than vehicles, such as gas and/or liquid containing tanks, pressurisable containers, airconditioned rooms and enclosures, and the like. The invention may be adapted to sealing the entire periphery of an opening, instead of merely one edge thereof as described with reference to the drawings.

Having thus described our invention, what we claim is:

1. A vehicle door arrangement comprising an upper main part and a lower edge part for closing a gap between the upper main part of the door and a doorway occupied by the door when in a closed position, and moving means operable to retract said lower edge part upwardly into the door prior to opening of the door from the closed position thereof and for extending the lower edge part downwardly to close the gap upon reaching said closed position, the lower edge part being hollow and deformable, inflatable and deflatable parts of the lower edge part being formed of inflatable and deflatable bladders enclosed within an outer enclosure of the lower edge part, the lower edge part being mounted by attachment to the ends of a rigid partition dividing the bladders, the ends being made accessible at ends of the outer enclosure, and said moving means comprising pneumatic means for inflating and deflating at least selected parts of the lower edge part.

2. A vehicle door arrangement according to Claim 1, wherein the lower edge part is divided into two parts respectively formed by at least one of said bladders, the parts being disposed on either side of said partition.

3. A vehicle door arrangement according to Claim 2, wherein each part or region is provided with an inlet/-outlet valve member cooperating in the closed position of the door with a like valve member fixed on the doorway, a respective valve in each valve member being held open when the door is closed and biased shut when the door is open, and operable to pass air to and from the parts when open and to block leakage of air when shut.

* * * * *